United States Patent
Ogawa et al.

(10) Patent No.: US 12,430,713 B2
(45) Date of Patent: Sep. 30, 2025

(54) METHOD OF DECONVOLUTING AND RESTORING IMAGE OBSERVED IN CHARGED PARTICLE BEAM APPARATUS, IMAGE PROCESSING APPARATUS, AND CHARGED PARTICLE BEAM APPARATUS EQUIPPED WITH IMAGE PROCESSING APPARATUS

(71) Applicant: KOREA RESEARCH INSTITUTE OF STANDARDS AND SCIENCE, Daejeon (KR)

(72) Inventors: Takashi Ogawa, Daejeon (KR); Junhyeok Hwang, Icheon-si (KR); In Yong Park, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 512 days.

(21) Appl. No.: 17/887,619

(22) Filed: Aug. 15, 2022

(65) Prior Publication Data
US 2023/0109872 A1    Apr. 13, 2023

(30) Foreign Application Priority Data
Oct. 7, 2021  (KR) .......................... 10-2021-0133534

(51) Int. Cl.
*G06K 9/00*  (2022.01)
*G06T 5/20*  (2006.01)
*G06T 5/73*  (2024.01)

(52) U.S. Cl.
CPC .................. *G06T 5/20* (2013.01); *G06T 5/73* (2024.01); *G06T 2207/10061* (2013.01)

(58) Field of Classification Search
CPC ....... H01J 2237/223; H01J 37/26–2955; H01J 2237/26–2857; G06T 5/10;
(Continued)

(56) References Cited

U.S. PATENT DOCUMENTS

| 12,190,478 B2 * | 1/2025 | Ozcan ...................... G06T 5/70 |
| 2014/0348440 A1 * | 11/2014 | Bergner .................... G06T 5/00 |
| | | 382/254 |

(Continued)

FOREIGN PATENT DOCUMENTS

| JP | 2004038362 A | 2/2004 |
| JP | 2011030911 A | 2/2011 |

(Continued)

OTHER PUBLICATIONS

S Shruthi et al., "Constrained least squares filtering followed by denoising of decomposed images using wave atom and wavelet transform", Procedia Computer Science, 2017, vol. 115, p. 526 / 532, DOI: 10.1016/j.procs.2017.09.110.

(Continued)

*Primary Examiner* — Atiba O Fitzpatrick
(74) *Attorney, Agent, or Firm* — Tarolli, Sundheim, Covell &Tummino LLP

(57) ABSTRACT

Provided is a method of deconvoluting and restoring an image observed in a charged particle beam apparatus. The method includes receiving, by an image processing apparatus, an observed image acquired by a detector of the charged particle beam apparatus, calculating, by the image processing apparatus, a point spread function (PSF), deconvoluting and restoring, by the image processing apparatus, the observed image using the observed image and the PSF, calculating, by the image processing apparatus, an evaluation function of the parameter applied to a process of the deconvoluting, and adjusting, by the image processing apparatus, the parameter on the basis of a result of the evaluation function, and restoring the image after deconvoluting the observed image and the PSF again using an optimal parameter. Furthermore, a charged particle beam apparatus using (Continued)

the above-described method of deconvoluting and restoring the image is provided.

8 Claims, 7 Drawing Sheets

(58) Field of Classification Search
CPC . G06T 2207/10056; G06T 2207/10061; G06T 5/00; G06T 5/20; G06T 5/73; G06T 5/70; G06V 20/69–698; G06V 10/30; G06V 10/44; G01N 23/225–2258; G06N 3/00–3/008; G06N 3/0985
See application file for complete search history.

(56) References Cited

U.S. PATENT DOCUMENTS

| | | | | |
|---|---|---|---|---|
| 2016/0180190 A1* | 6/2016 | Lifshin | | H01J 37/28 382/201 |
| 2017/0191945 A1 | 7/2017 | Zhang et al. | | |
| 2019/0333199 A1* | 10/2019 | Ozcan | | G06T 5/70 |
| 2020/0294204 A1* | 9/2020 | Kalinin | | G02B 21/0084 |
| 2021/0248720 A1* | 8/2021 | Ziesche | | A61B 90/20 |
| 2022/0156892 A1* | 5/2022 | Slutsky | | G06N 3/08 |
| 2022/0277426 A1* | 9/2022 | Vyas | | G06T 5/73 |
| 2023/0085827 A1* | 3/2023 | Ozcan | | G06V 10/751 348/79 |
| 2023/0319401 A1* | 10/2023 | Feng | | G06T 7/20 348/241 |

FOREIGN PATENT DOCUMENTS

| | | |
|---|---|---|
| JP | 2013246062 A | 12/2013 |
| JP | 2014116207 A | 6/2014 |

OTHER PUBLICATIONS

Murayama Yasuhiko, Japanese Office Action, issued Jun. 5, 2023, JP Patent Application No. 2022-130753, pp. 1-11.

* cited by examiner

Sharpness : 1.49 nm, CNR : 10.1

(A)

Sharpness : 1.02 nm, CNR : 55.1, $\gamma_{Opt.} = 0.25$ (B)

(C)

(D)

(A)

(B)

(A)

(B)

(C)

(D)

METHOD OF DECONVOLUTING AND RESTORING IMAGE OBSERVED IN CHARGED PARTICLE BEAM APPARATUS, IMAGE PROCESSING APPARATUS, AND CHARGED PARTICLE BEAM APPARATUS EQUIPPED WITH IMAGE PROCESSING APPARATUS

CROSS-REFERENCE TO RELATED APPLICATION

This application claims priority to and the benefit of Korean Patent Application No. 2021-0133534, filed on Oct. 7, 2021, the disclosure of which is incorporated herein by reference in its entirety.

BACKGROUND

1. Field

The following description relates to a method of restoring an image observed in a charged particle beam apparatus, and a charged particle beam apparatus. Particularly, the following description relates to a method of restoring an image by automatically setting parameters used in a process of restoring an observed image, and a charged particle beam apparatus equipped with an image processing apparatus.

This research was financially supported in parts by the Ministry of Science and ICT and Commercialization Promotion Agency for R&D Outcomes (COMPA) (Project Number: (2022) ERIC01-1), and in parts by COMPA (2022-Performance Advancement & Foundation Construction-01).

2. Discussion of Related Art

A charged particle beam apparatus is an apparatus which focuses a charged particle beam emitted from a source on a surface of a sample by using a charged particle optical system that uses electric fields and magnetic fields, to form an image, and which irradiates the sample with the charged particle beam. Charged particle beam apparatuses are being widely used in fields of materials science, nanoscience, and electronic engineering. Since high spatial resolution can be obtained through microscopic observation with a charged particle beam apparatus, it is possible to observe structures that are too small to be observed with a general optical microscope, such as thin films grown on a substrate, nanotubes, plasmonic structures, and atomic arrangement of samples. Due to such high resolution, the charged particle beam apparatus can also observe a microstructure of biological samples such as cells, and can also identify a crystal structure of samples through an electron beam diffraction image.

SUMMARY

An image observed in a charged particle beam apparatus is restored through an image processing process. Various methods have been studied for restoring an observed image, and a representative method is using a Wiener filter. However, the image is restored in such a way that a user adjusts parameters during a process of restoring the observed image. Therefore, there is a limit in that the quality of the restored image varies depending on the user's experience or it takes a long time to restore the image with good quality. Furthermore, when the Wiener filter is applied, there is a limit in that restoration performance of an image with a lot of noise is significantly degraded.

The following description is directed to providing a method of automatically setting optimal parameters used for restoration of an observed image, and a charged particle beam apparatus equipped with an image processing apparatus. The following description is also directed to providing a filter that maintains high restoration quality even for an image with a lot of noise.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has"

specify the presence of stated features, numbers, operations, members, elements, and/or combinations thereof, but do not preclude the presence or addition of one or more other features, numbers, operations, members, elements, and/or combinations thereof.

Examples of a charged particle beam apparatus include an apparatus that uses an electron source, such as a scanning electron microscope (SEM), a scanning transmission electron microscope (STEM), or the like, and an apparatus that uses an ion beam, such as a focused ion beam (FIB), a helium ion microscope (HIM), or the like. Furthermore, the charged particle beam apparatus includes an apparatus equipped with a device using electron energy loss spectroscopy (EELS), auger electron spectroscopy (AES), or energy dispersive X-ray spectroscopy (EDX). Hereinafter, a microscope is a charged particle beam-based apparatus.

Figure 1:
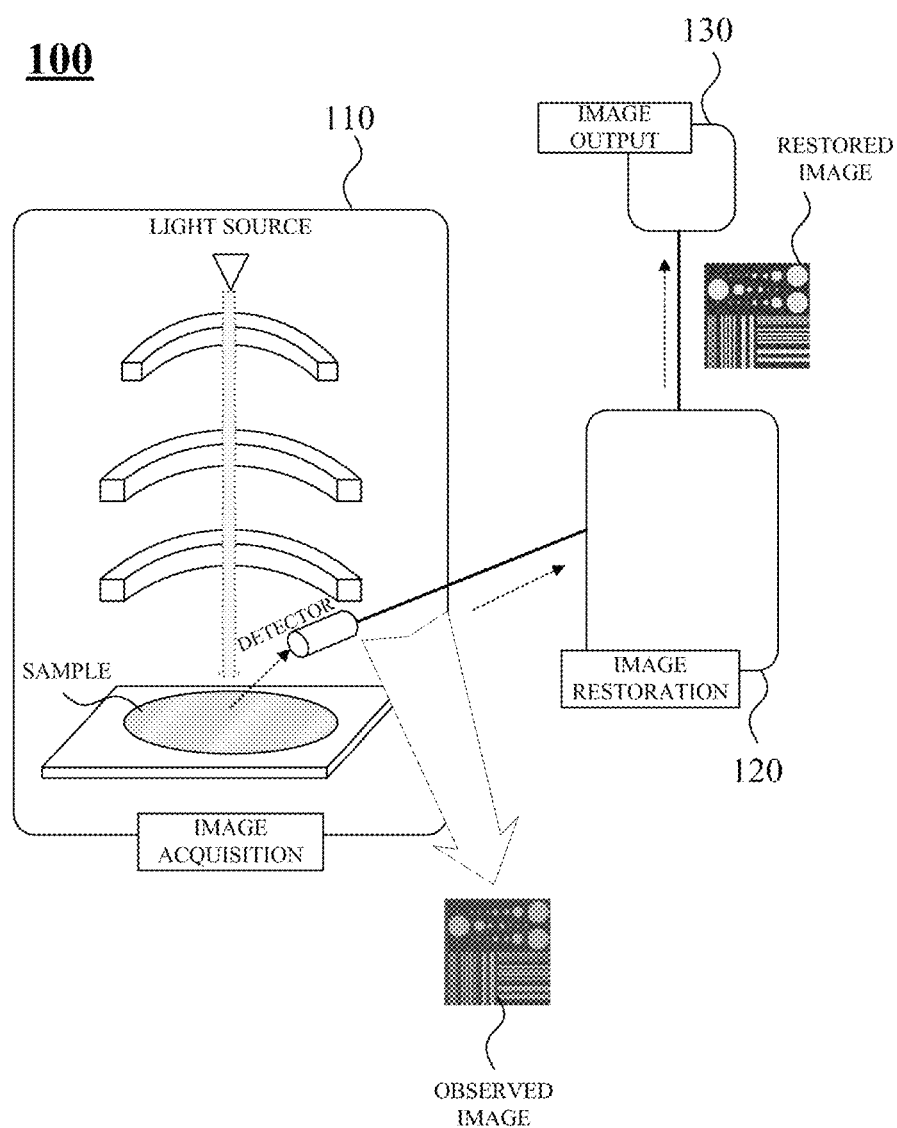
FIG. 1 is an example of a schematic structure of a charged particle beam system.

A technique to be described below is a method of restoring an image of a sample which is acquired by a charged particle beam apparatus. FIG. 1 is an example of a schematic structure of a charged particle beam system 100. The charged particle beam system 100 includes a charged particle beam apparatus 110, an image processing apparatus 120, and an output device 130. The charged particle beam system 100 has the image processing apparatus 120 for restoring an image of a sample which is acquired by the charged particle beam apparatus 110.

The charged particle beam apparatus 110 may be any one of various types of apparatuses as described above. The charged particle beam apparatus 110 includes a source, a focusing lens, an aperture, a scanning system, an objective lens, a detector, and the like. The source is an electron source or an ion source. The focusing lens is a lens that uses a magnetic field and an electric field, and the focusing lens serves to focus and transmit charged particles. The aperture is used to remove an unnecessary part from the source and, along with each lens, optimize an optical system. The scanning system is used to scan a surface of the sample with a charged particle beam, and electronic signals generated at a corresponding point are collected through the detector. The objective lens serves to finally focus on the surface of the sample.

The image processing apparatus 120 restores an image (observed image) which is observed by the detector on the surface of the sample. The restoration process and detailed structure will be described below. The image processing apparatus 120 may transmit the restored image to a separate output device 130.

When the surface of the sample is scanned with the charged particle beam, the detector collects signals generated on the surface of the sample. The technique to be described below is a technique for generating an image by restoring images of a sample acquired by the charged particle beam apparatus. Therefore, a detailed description of a process of acquiring signals of a surface of a sample, which is a process before image restoration, will be omitted. Hereinafter, description will be made assuming a case in which the image processing apparatus performs image restoration. The image processing apparatus is an apparatus for restoring the image observed from the sample scanned with the charged particle beam. The image processing apparatus is a computer device capable of performing data and image processing.

First, a general process in which the image acquired by the charged particle beam apparatus is restored will be described.

A microscope image (observed image) h(r) is convolution of information f(r) of the sample and a point spread function (PSF) g(r), and is expressed as Equation 1 below.

[Equation 1]

$$h(r)=f(r) \cdot g(r)$$

Original information on the sample is distorted due to the PSF when the process of Equation 1 is performed. However, the original information on the sample may be deconvoluted and restored as shown in Equation 2 below.

$$f(r) = \mathcal{F}^{-1}\left(\frac{\mathcal{F}(h(r))}{\mathcal{F}(g(r))}\right) \quad \text{[Equation 2]}$$

In Equation 2, F and $F^{-1}$ denote the Fourier transform and the inverse Fourier transform, respectively. The process as shown in Equation 2 is called an inverse filter method which is one of image restoration methods. However, such a process is effective only when noise of the image is negligibly small. A microscope image including noise η(r) may be expressed as Equation 3 below.

[Equation 3]

$$h(r)=f(r) \times g(r)+\eta(r)$$

When the image formed as shown in Equation 3 is restored using Equation 2, a term corresponding to the noise remains, and thus the restoration is not properly performed or it rather results in noise amplification.

Further, a PSF to which characteristics of the charged particle optical system are reflected should be defined. Various methods for calculating the PSF have been studied. An image in which noise cannot be ignored may be restored by applying a Wiener filter as shown in Equation 4 below.

$$f'(r) = \mathcal{F}^{-1}\left[\frac{G*(k)}{|G(k)|^2 + K}\right]H(k) \quad \text{[Equation 4]}$$

In Equation 4, G(k) and H(k) denote the Fourier transforms of g(r) and h(r), respectively, and K denotes a signal-to-noise ratio (SNR). Further, the restored image may be regularized by Equation 5 below.

$$D(f(r)) = \underset{f(r)}{\operatorname{argmin}}\left\{\|g(r) * \hat{f}(r) - h(r)\|_2^2 + \lambda R(\hat{f}(r))\right\} \quad \text{[Equation 5]}$$

In Equation 5, R($\hat{f}$(r)) denotes a regularization term, and λ denotes a weight that is a smoothing parameter. Eventually, in order acquire a high-quality restored image, the parameters K and λ should be appropriately selected. Conventionally, a device developer or a user sets and uses parameters according to experience.

Figure 2:
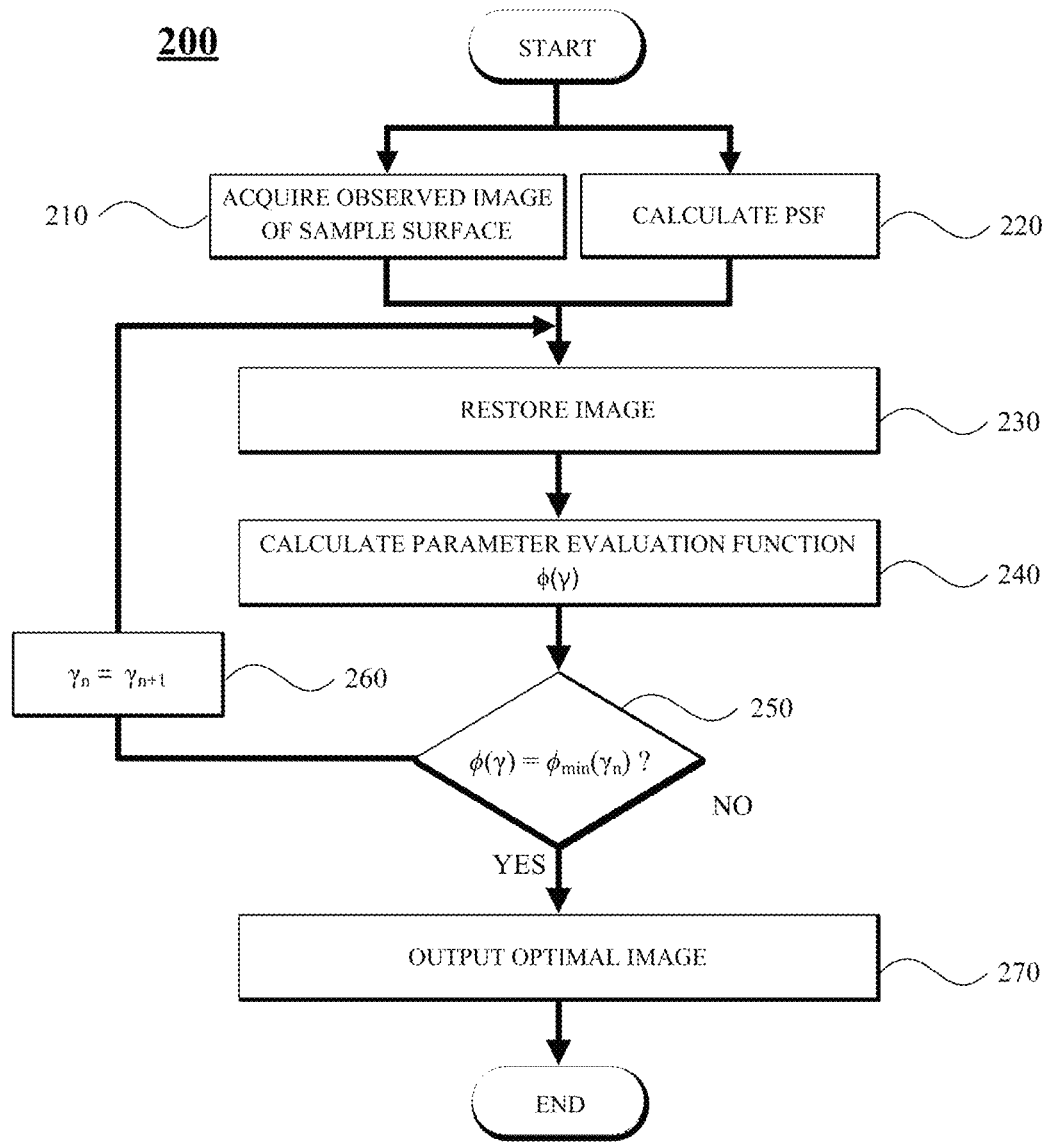
FIG. 2 is an example of a process in which an image processing apparatus restores an image observed in a charged particle beam apparatus.

FIG. 2 is an example of a process 200 in which an image processing apparatus restores an image observed in a charged particle beam apparatus. A process described below is an example in which the image processing apparatus automatically applies an optimal parameter for image restoration.

The image processing apparatus acquires an image observed by the detector with respect to the surface of the sample scanned with a charged particle beam (210). The image processing apparatus calculates a PSF (220). The PSF may be calculated using any one of various methods or algorithms which are conventionally studied.

The image processing apparatus restores the image through the above-described processes (Equations 4 and 5) (230). The image processing apparatus calculates an evaluation function for parameter optimization (240). The evaluation function is as shown in Equation 6 below.

$$\phi(\gamma) = \left| \frac{1}{N-1} \frac{1}{M-1} \sum_{n=0}^{N} \sum_{m=0}^{M} \psi_{m,n}(r; \gamma) \right|$$ [Equation 6]

Here, γ denotes an optimization parameter. The parameter may be at least one of the Wiener filter setting parameter K of Equation 4 and the regularization parameter λ of Equation 5.

$$\psi(r; \gamma) = h(r) - g(r) \cdot \hat{f}(r; \gamma)$$ [Equation 7]

$$\gamma_{Opt.} = \underset{\gamma}{\arg\min} \phi(\gamma)$$ [Equation 8]

It is assumed that an average of the noise added to the image before restoration is 0. The average of the noise contributes to a change in average brightness of the image. However, the average brightness may be controlled to facilitate image observation by the microscope user and may be difficult to distinguish from the average of the noise. Therefore, even when the average of the noise added to the image is not 0, this assumption is not a problem because it can be understood that the average of the noise has already been included by the brightness of the image.

Figure 3:
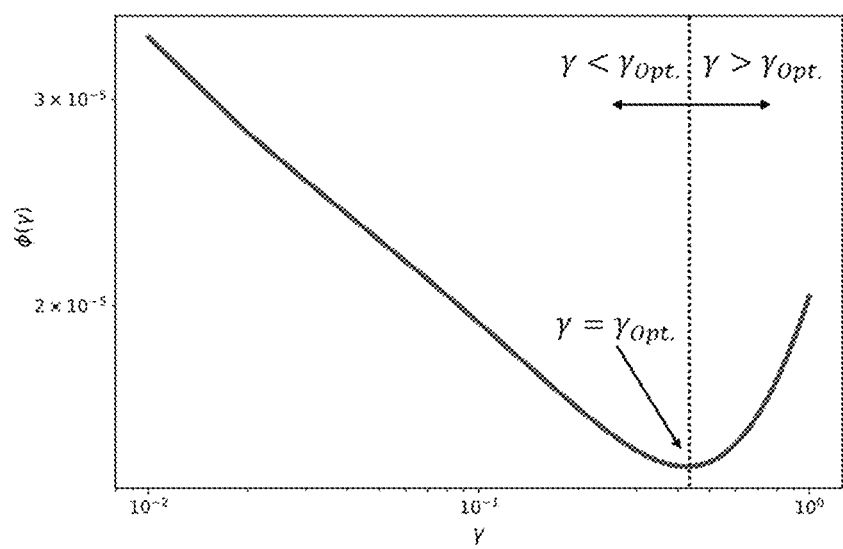
FIG. 3 is an example of a result of calculating an evaluation function.

Equation 7 corresponds to a difference between an original image and the restored image. When the image is closely restored to the original image, a result of calculating Equation 7 becomes the noise added to the original image. When it is assumed that the average of the noise is 0, a result of Equation 8 approaches 0 when the image is most closely restored to the original image. FIG. 3 is an example of a result of calculating a parameter evaluation function.

The image processing apparatus determines whether the result of the parameter evaluation function of Equation 6 is optimal (250). In this case, the image processing apparatus may output the evaluation result to a screen in the form as shown in FIG. 3. By observing the evaluation result while changing the parameter, it is possible to determine whether a current parameter is optimal.

When it is determined that the result of calculating the parameter evaluation function is not optimal, a process 260 of restoring and evaluating the image by applying another parameter is repeated.

Since the image processing apparatus restores the image on the basis of the parameter evaluation according to Equations 6 to 8, it is possible to restore the image with only the PSF and the original image without a need to use an intact image that is not distorted due to the PSF and noise or the like.

When it is determined that the result of calculating the parameter evaluation function for the current parameter is not optimal, the image processing apparatus applies another parameter to restore the image. In this case, the image processing apparatus may determine the parameter using an optimization algorithm (e.g., gradient descent, robust regression, etc.).

In some cases, the image processing apparatus may perform a process of restoring the image using a value of a parameter input by the user.

When it is determined that the result of calculating the parameter evaluation function is optimal, the currently restored image is optimal, and thus the optimal image is output (270).

Furthermore, although not shown in FIG. 2, the image processing apparatus may evaluate the quality of the finally output restored image. For example, the image processing apparatus may evaluate sharpness or resolution according to the International Organization for Standardization (ISO) standard (ISO/TS 24597:2011(E)), and quantitatively determine the quality of the image from the evaluated sharpness or resolution and a contrast-to-noise ratio (CNR).

Figure 4:
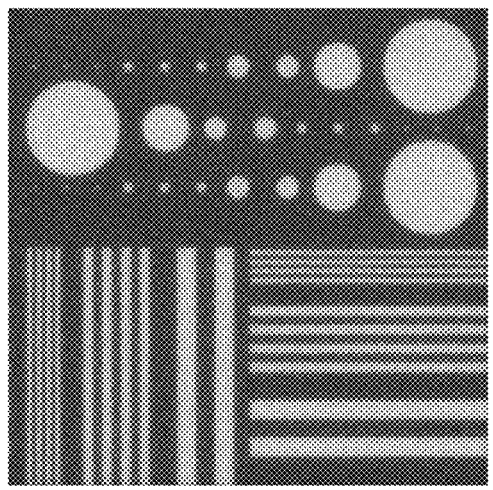
FIG. 4 shows examples in which images restored by an image processing apparatus are output.
Figure 4:
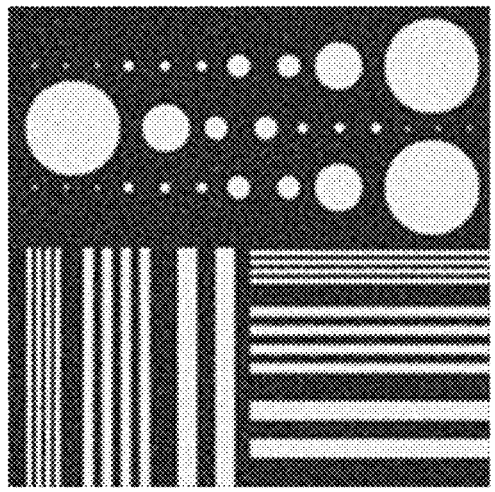
Figure 4:
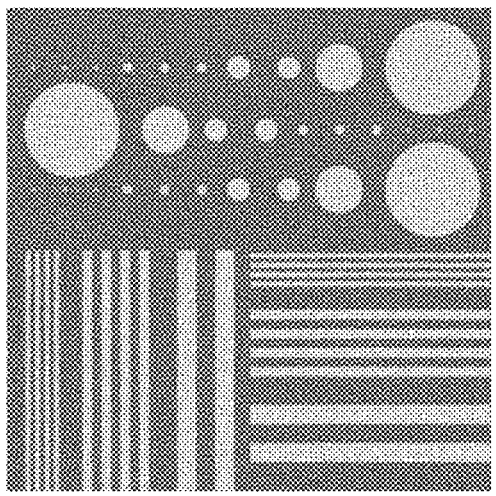
Figure 4:
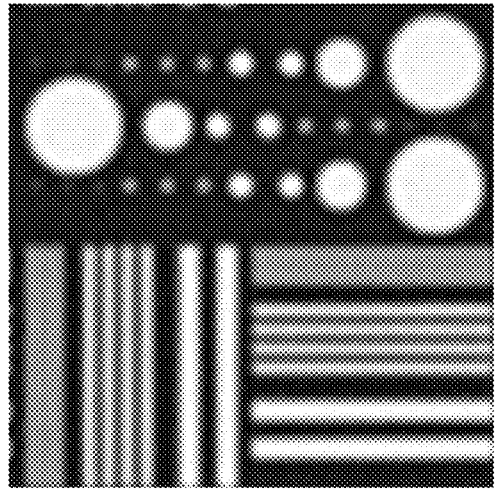

Meanwhile, the image processing apparatus may output the image and information, which are generated while restoring the image by applying the parameter, to a display device. In this case, the image processing apparatus may output the image which includes information such as the CNR and the sharpness. FIG. 4 shows examples in which images restored by the image processing apparatus are output. FIG. 4A is an original image before restoration (i.e., an image of the surface of the sample acquired by the detector). In this case, sharpness is 1.49 nm, and a CNR is 10.1. FIG. 4B is an example of an optimally restored image. In this case, sharpness is 1.02 nm, a CNR is 55.1, and $\gamma_{opt.}$=0.25. By providing the image together with the information such as the sharpness, the CNR, and the like, it is possible for the user to quantitatively identify the quality of the restored image. FIG. 4C is an image restored when the parameter γ is set to 0.001, and in this case, $\gamma < \gamma_{opt}$. As shown in FIG. 4C, the sharpness of the image can be improved, but the image is not properly restored due to a large influence of artifacts on the image. FIG. 4D is an image restored when the parameter γ is set to 50, and in this case, $\gamma > \gamma_{opt}$. As shown in FIG. 4D, the influence of artifacts on the image is small, but it results in significant degradation of the sharpness. Therefore, it can be seen that when the parameter deviates too much from $\gamma_{opt.}$, the image is not properly restored.

The image processing apparatus may restore the image with certain parameters to output results of the restoration as shown in FIG. 4. In this case, the image processing apparatus may output all the images that have been repeatedly restored. The user may compare the output restored images to identify restoration performance according to the parameters.

Figure 5:
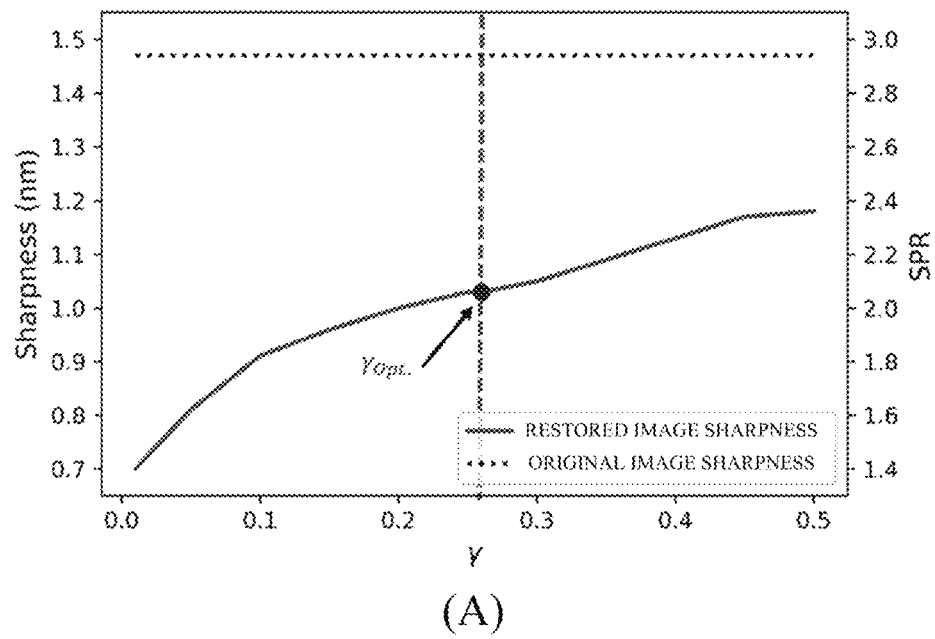
FIG. 5 shows examples in which quality information of restored images is output.
Figure 5:
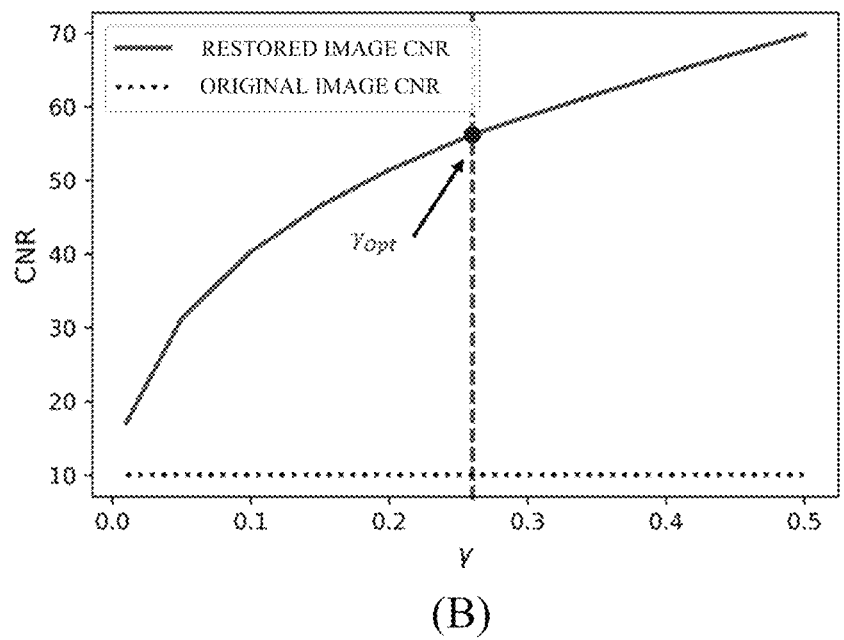

Further, the image processing apparatus may generate and output separate information for evaluating the quality of the image to the screen. FIG. 5 shows examples in which quality information of restored images is output. FIG. 5A is an example of sharpness-related information being output. FIG. 5A is an example of sharpness and a sharpness to pixel size ratio (SPR) according to the parameter γ being displayed. In FIG. 5A, the sharpness of the restored image has a value smaller than that of the original image, and thus it means that the quality of the restored image is excellent. FIG. 5B is an example of a CNR according to the parameter γ being displayed. In FIG. 5B, the CNR of the restored image has a value greater than that of the original image, and thus it means that the quality of the restored image is excellent.

Meanwhile, when a Wiener filter is used, there is a problem in that restoration performance is particularly degraded in an image having a low SNR. In order to overcome the above problem, the image processing apparatus may use a constrained least square filter (CLSF). The image processing apparatus may apply the CLSF to the image restoration process as shown in Equation 9 below. Equation 9 is an equation in the form of applying the CLSF to Equation 4 described above. That is, the image processing apparatus may restore the image using Equation 9 to which the CLSF is applied, unlike Equation 4 described above.

$$\hat{f}(r;\gamma) = \mathcal{F}^{-1}\left[\frac{G^*(k)}{|G(k)|^2 + \gamma|P(k)|^2}\right]H(k) \quad \text{[Equation 9]}$$

$$P(k) = \mathcal{F}^{-1}(P(r)) \quad \text{[Equation 10]}$$

$$P(r) = \begin{bmatrix} 0 & -1 & 0 \\ -1 & 4 & -1 \\ 0 & -1 & 0 \end{bmatrix} \quad \text{[Equation 11]}$$

Figure 6:
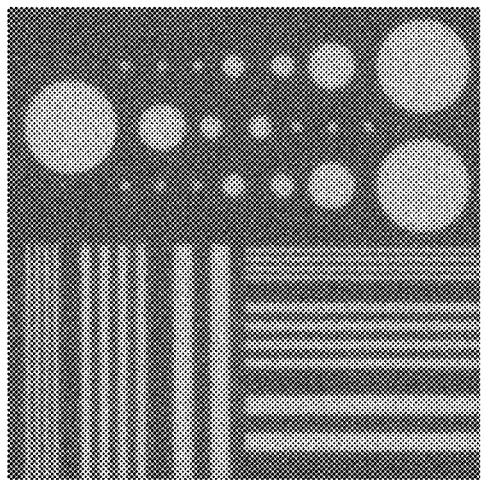
FIG. 6 shows examples in which images with a lot of noise are restored.
Figure 6:
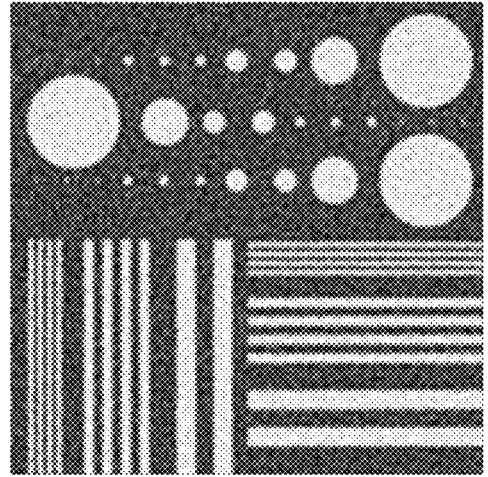
Figure 6:
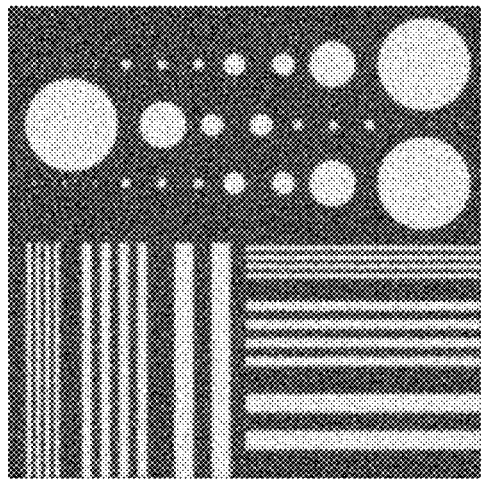
Figure 6:
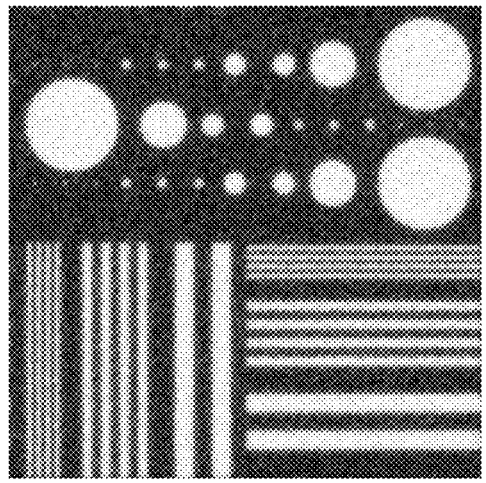

FIG. 6 shows examples in which images with a lot of noise are restored. FIG. 6A is an original image with a lot of noise. FIG. 6B is an image obtained by restoring the image of FIG. 6A with a CLSF. In the restored image of FIG. 6B, sharpness is 1.22 nm, a CNR is 56.0, and $\gamma_{opt.}$ is 0.54. FIGS. 6C and 6D show images obtained by restoring the image of FIG. 6A with a Wiener filter. In the restored image of FIG. 6C, sharpness is 1.22 nm, a CNR is 27.6, and K is 0.123. In the restored image of FIG. 6D, sharpness is 1.82 nm, a CNR is 57, and K is 0.57. Therefore, it can be seen that the image has the highest quality when the CLSF is applied to restore the image with a lot of noise.

Figure 7:
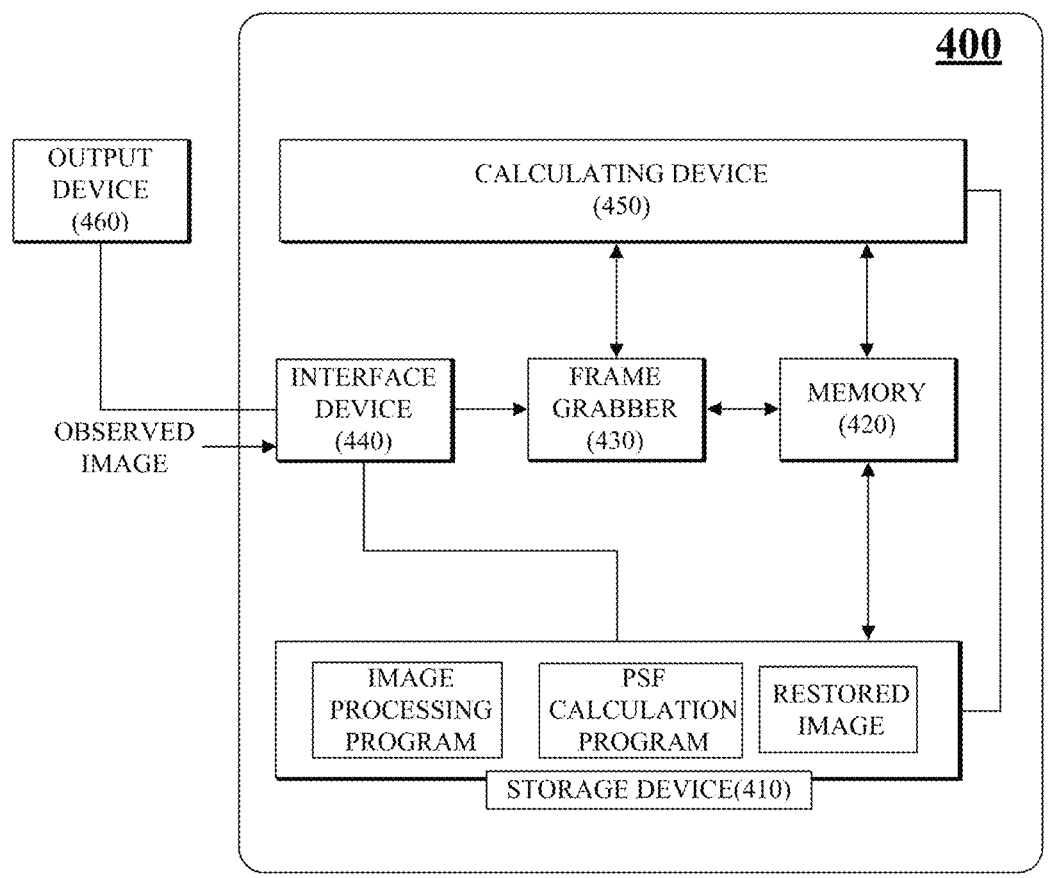
FIG. 7 is an example of an image processing apparatus that restores an image.

FIG. 7 is an example of an image processing apparatus 400 that restores an image. The image processing apparatus 400 corresponds to the image processing apparatus 120 of FIG. 1. The image processing apparatus 400 may include a storage device 410, a memory 420, a frame grabber 430, an interface device 440, and a calculating device 450. Furthermore, the image processing apparatus 400 may further include an output device 460.

The storage device 410 may store a program or code for restoring an image acquired by the charged particle beam apparatus.

The storage device 410 may store a program for PSF calculation. The program performs a function of calculating the PSF.

The storage device 410 may store an image processing program. The image processing program performs a function of restoring the observed image.

The storage device 410 may receive and store the observed image.

The storage device 410 may store the restored image.

The memory 420 may store data, information, and the like which are generated in the process in which the image processing apparatus 400 restores the observed image.

The frame grabber 430 is a device that converts the observed image into certain image data. The frame grabber 430 may convert an analog image into digital data of a certain format. The frame grabber 430 may receive the observed image through the interface device 440. The image data converted by the frame grabber 430 may be provided to the storage device 410, the memory 420, or the calculating device 450.

The interface device 440 is a device that receives certain commands and data from an external device. The interface device 440 may receive the observed image from the charged particle beam apparatus physically connected thereto.

The interface device 440 may receive certain information or commands from the user. For example, the interface device 440 may receive an image restoration command, a parameter used for image restoration, and the like.

The interface device 440 may transmit the restored image to the output device 460 or the external object.

Although not shown in FIG. 7, the image processing apparatus 400 may include a communication device. The communication device is a component that receives and transmits certain information through a wired or wireless network. The communication device may receive the observed image from the charged particle beam apparatus or the external object. Alternatively, the communication device may transmit the restored image to the external object such as a user terminal.

The calculating device 450 may restore the observed image using commands or program code stored in the storage device 410. The calculating device 450 is a device, such as a semiconductor device or chip, in which a processor, an application processor (AP), or a program for processing a certain calculation is embedded. The calculating device 450 may be a processor such as a central processing unit (CPU) or a graphics processing unit (GPU).

The calculating device 450 calculates the PSF using a PSF calculation program. The PSF calculation may be performed using any one of various methods conventionally studied.

The calculating device 450 restores information on a sample through deconvolution. The deconvolution is the same as described in Equation 2 above. Furthermore, the calculating device 450 may restore the image using a Wiener filter as shown in Equation 4. The calculating device 450 may regularize the restored image using Equation 5.

The calculating device 450 may perform a process of removing noise included in the observed image before image restoration. Thereafter, the observed image from which the noise is removed may be restored.

The calculating device 450 may perform a process of finding an optimal parameter for restoring the image as described in FIG. 2.

The calculating device 450 may calculate the parameter evaluation function as shown in Equation 6.

The calculating device 450 may determine whether a current parameter is an optimal parameter. When it is determined that the current parameter is not the optimal parameter, the calculating device 450 changes the parameter and performs a process of restoring the image again. In this case, the calculating device 450 may select the parameter using an optimization algorithm (e.g., gradient descent, robust regression, etc.). The calculating device 450 may control such that the output device 460 outputs the restored image.

The calculating device 450 may restore the image by applying the CLSF as shown in Equation 9.

The calculating device 450 may repeatedly perform the process of finding the optimal parameter while changing the parameter. As described in FIG. 3, since the result of the parameter evaluation function is changed when the parameter is changed, the calculating device 450 may find the optimal parameter while repeatedly changing the parameter.

The calculating device 450 may evaluate the image restored as described above by using the ISO standard or the like. The calculating device 450 may control such that the output device 460 outputs evaluation indexes (e.g., sharpness, CNR, etc.).

The calculating device 450 may store the image restored using the finally selected parameter in the storage device 410. Further, the calculating device 450 may control such that the output device 460 outputs the final optimally restored image.

The output device 460 is a device that outputs certain information. The output device 460 may output an interface necessary for a data processing process, the restored image, and the like.

As described above, examples of the charged particle beam apparatus include an apparatus that uses an electron source, such as a SEM, an STEM, or the like, and an apparatus that uses an ion beam, such as a FIB, HIM, or the like.

The charged particle beam apparatus uses electrons or ions as a source. Examples of the electron source may include tungsten (W), lanthanum hexaboride ($LaB_6$), cerium hexaboride ($CeB_6$), a Schottky emitter, a cold field emitter, etc. Examples of the ion source may include a liquid metal ion source (LMIS) using metal ions such as Ga, In, Au, Bi, etc. or a gas field ion source (GFIS) using gas such as He, Ne, $H_2$, $O_2$, $N_2$, Ar, Xe, etc.

The charged particle beam apparatus uses an electron source as a source to focus on a sample, scans the sample with an electron beam, and allows the detector disposed inside the charged particle beam apparatus to detect a signal composed of secondary electrons, reflected electrons, transmitted electrons, Auger electrons, energy-loss electrons, and X-rays emitted from the sample. Thereafter, the charged particle beam apparatus may restore the observed image detected by the detector by using the above-described method of restoring the image or image processing apparatus.

The charged particle beam apparatus may use an electron source as a source to uniformly irradiate the sample with the electron beam, magnify transmitted electrons emitted from the sample, and restore the observed image formed by a screen-type detector by using the above-described method of restoring the image or image processing apparatus.

The charged particle beam apparatus uses an ion source as a source to focus on a sample, scans the sample with an ion beam, and allows the detector disposed inside the charged particle beam apparatus to detect a signal composed of secondary electrons, secondary ions, reflected ions, transmitted ions, Auger electrons, and X-rays emitted from the sample. Thereafter, the charged particle beam apparatus may restore the observed image detected by the detector by using the above-described method of restoring the image or image processing apparatus.

Further, the image restoration method in the charged particle beam apparatus as described above may be implemented as a program (or application) including an executable algorithm that can be executed in a computer. The program may be provided by being stored in a temporary or non-transitory computer readable medium.

The non-transitory computer readable medium is not a medium that stores data for a short moment, such as a register, a cache, a memory, etc., but a medium that stores data semi-permanently and may be read by a device. Specifically, various applications or programs may be stored and provided in a compact disc read only memory (CD-ROM), a digital video disc (DVD), a hard disk, a Blu-ray disc, a Universal Serial Bus (USB) flash drive, a memory card, a read-only memory (ROM), a programmable read only memory (PROM), an erasable PROM (EPROM), or an electrically EPROM (EEPROM), or a non-transitory readable medium such as a flash memory or the like.

The transitory computer readable medium includes any one of various random access memories (RAMs) such as a static RAM (SRAM), a dynamic RAM (DRAM), a synchronous DRAM (SDRAM), a double data rate SDRAM (DDR SDRAM), an enhanced SDRAM (ESDRAM), a SyncLink DRAM (SLDRAM), and a Direct Rambus DRAM (DRDRAM).

According to the technique described above, the image processing apparatus can automatically find the optimal parameters, and thus it is possible to provide a high-quality restored image. Further, according to the technique described above, even in the case of an image with a lot of noise, by applying an improved filter to the image, it is possible to provide a high-quality restored image.

The embodiments and the accompanying drawings only clearly show a part of the technical idea included in the above-described technique, and it will be apparent that all modifications and specific embodiments that can be easily construed by those skilled in the art within the scope of the technical idea included in the specification and drawings of the above-described technique are included in the scope of the above-described technique.

What is claimed is:

1. A method of restoring an image observed in a charged particle beam apparatus, the method comprising:
receiving, by an image processing apparatus, an observed image acquired by a detector of the charged particle beam apparatus;
calculating, by the image processing apparatus, a point spread function (PSF);
restoring, by the image processing apparatus, the observed image using the observed image and the PSF;
calculating, by the image processing apparatus, an evaluation function of a parameter applied to a process of the restoring; and
adjusting, by the image processing apparatus, the parameter on the basis of a result of the evaluation function to generate an optimal parameter, and restoring the observed image by deconvoluting the observed image and the PSF again using the optimal parameter,
wherein the evaluation function of the parameter is expressed as the following equation and the image processing apparatus determines the parameter when the result of the evaluation function of the parameter has a lowest value, as the optimal parameter:

$$\phi(\gamma) = \left| \frac{1}{N-1} \frac{1}{M-1} \sum_{n=0}^{N} \sum_{m=0}^{M} \psi_{m,n}(r; \gamma) \right|$$

wherein $\phi(\gamma)$ denotes the evaluation function of the parameter, $\gamma$ denotes an optimization parameter, and $\psi(r;\gamma)$ corresponds to a difference between an original image and an image restored by applying the parameter $\gamma$.

2. The method of claim 1, wherein the parameter includes at least one of a Wiener filter parameter and a regularization parameter.

3. The method of claim 1, wherein the image processing apparatus adjusts the parameter using an optimization algorithm.

4. The method of claim 1, further comprising providing, by the image processing apparatus, sharpness and contrast-to-noise-ratio (CNR) information on the restored image.

5. The method of claim 1, wherein the image processing apparatus restores the observed image by applying a constrained least square filter (CLSF) to the process of the deconvoluting.

6. The method of claim 5, wherein the image processing apparatus restores the observed image by applying the CLSF to the process of the deconvoluting as shown in the following equation:

$$\hat{f}(r; \gamma) = \mathcal{F}^{-1}\left[\frac{G^*(k)}{|G(k)|^2 + \gamma|P(k)|^2}\right]H(k),$$

$$P(k) = \mathcal{F}^{-1}(P(r)), \; P(r) = \begin{bmatrix} 0 & -1 & 0 \\ -1 & 4 & -1 \\ 0 & -1 & 0 \end{bmatrix}$$

(G(k) denotes the Fourier transform of a PSF g(r), H(k) denotes the Fourier transform of an observed image h(r), and $\gamma$ denotes an optimization parameter).

7. A charged particle beam apparatus for restoring an observed image of a sample by using the method of restoring an image observed in the charged particle beam apparatus of claim 1.

8. The charged particle beam apparatus of claim 7, wherein the charged particle beam apparatus uses an electron source or an ion source as a source, scans the sample with an electron beam or an ion beam, and allows a detector to detect a signal emitted from the sample.

* * * * *